United States Patent [19]
Parton

[11] 3,892,742
[45] July 1, 1975

[54] REACTIVE DYESTUFFS

[75] Inventor: Brian Parton, Manchester, England

[73] Assignee: Imperial Chemical Industries Limited, London, England

[22] Filed: Aug. 20, 1973

[21] Appl. No.: 389,546

[30] Foreign Application Priority Data
Sept. 6, 1972  United Kingdom............. 41351/72

[52] U.S. Cl..................... 260/246 R; 8/1 B; 8/54.2; 8/178 R; 8/178 E
[51] Int. Cl............................................. C09b 19/02
[58] Field of Search...................................... 260/246

[56]  References Cited
UNITED STATES PATENTS
2,086,871   7/1937   Kranzlein et al.................. 260/246

FOREIGN PATENTS OR APPLICATIONS
192,053   10/1937   Switzerland...................... 260/246
195,862    5/1938   Switzerland...................... 260/246

Primary Examiner—Harry I. Moatz
Attorney, Agent, or Firm—Cushman, Darby & Cushman

[57] ABSTRACT

Dyestuffs of the formula:

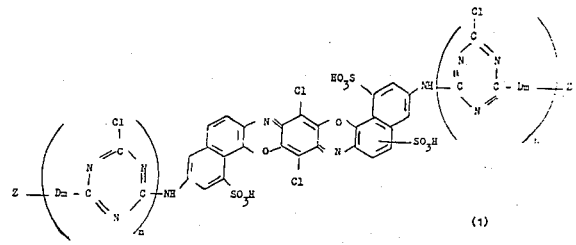

wherein Z represents an acyl or heterocycylc radical containing at least one cellulose-reactive substituent, $n$ is 0 or 1 and Dm is a N,N'-diamine residue.

These dyes are cellulose-reactive dyes giving bright reddish-blue shades of high tinctorial value and having good fastness to washing and to light.

5 Claims, No Drawings

REACTIVE DYESTUFFS

This invention relates to new reactive dyestuffs and provides dyestuffs of the formula:

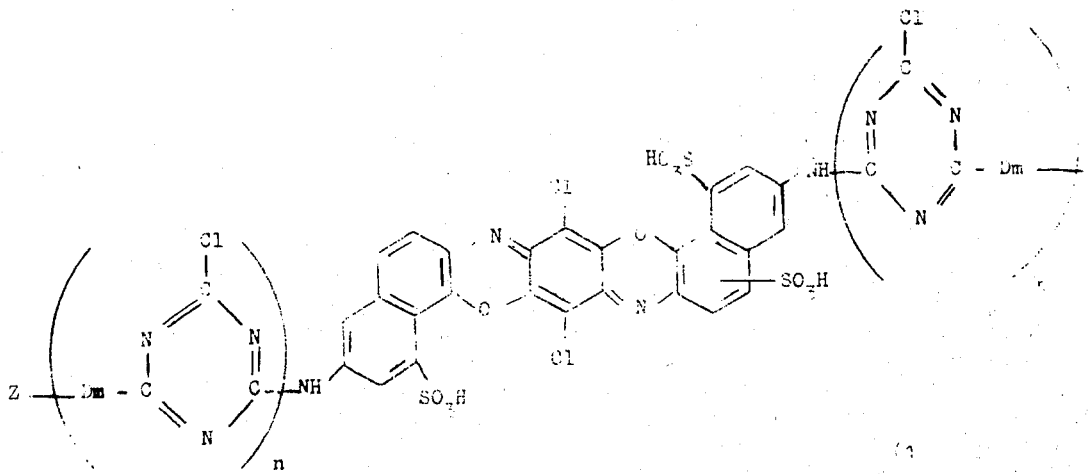

wherein Z represents an acyl or heterocyclic radical containing at least one cellulose-reactive substituent, *n* is 0 or 1 and Dm is a N,N'-diamine residue.

The symbol Dm may represent, for example, the residue of an aliphatic, aromatic or heterocyclic diamine, e.g. alkylene or naphthylene diamines or piperazine, but more especially a diamine of the benzene series which contains one or two benzene rings, e.g. a phenylene, sulphophenylene, disulphophenylene, disulphodiphenylene, disulphostilbene, disulphodiphenylmethane, disulphodiphenylamine, disulphodiphenylurea, or disulphodiphenoxyethane diamine residue.

By "cellulose-reactive substituent" is meant an unsaturated linkage or a substituent capable of reacting with the hydroxyl groups of the cellulose molecule in the presence of an alkaline substance and attaching the dyestuff molecule by a covalent linkage.

As examples of groups represented by Z, there may be mentioned α,β-unsaturated acyl radicals of aliphatic carboxylic acids, for example, acrylic acid, α-chloroacrylic acid, propiolic acid, maleic acid and mono- and di-chloromaleic acids; also the acyl radicals of acids which contain a substituent which reacts with cellulose in the presence of an alkali, e.g. the radical of a halogenated aliphatic acid such as chloroacetic acid, β-chloro- and β-bromo-propionic acids and α,β-dichloro- and dibromo-propionic acids. Other examples of cellulose-reactive groups are tetrafluorocyclobutyl carbonyl, trifluorocyclobutenyl carbonyl, tetrafluorocyclobutylethenyl carbonyl, trifluorocyclobutenylethenyl carbonyl, and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example:

2:3-dichloro-quinoxaline-5- or -6-carbonyl,
2:4-dichloro-quinazoline-6-carbonyl,
1:4-dichloro-phthalazine-6-carbonyl,
4:5-dichloro-pyridazon-1-yl,
2:4-dichloro-pyrimidine-5-carbonyl,
3-(4':5'-dichloro-pyridaz-6'-on-1'-yl)benzoyl,
5-chloro-2-methylsulphonyl-6-methyl-pyrid-4-yl,
2,4-difluoro-5-chloropyrimid-6-yl,
and more particularly s-triazin-2-yl and pyrimidin-2-yl or -4-yl radicals which contain on at least one of the remaining 2,4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

wherein $Y^1$ represents a group of atoms necessary to form a 5- or 6-membered heterocyclic ring which may carry substituents or form part of a fused ring system; or a quaternary ammonium or pyridinium group; or a group of the formula:

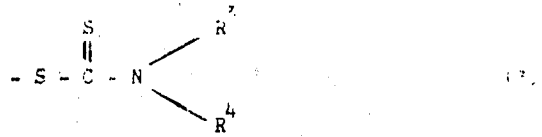

wherein $R^3$ and $R^4$ each represents the same or different alkyl, cycloalkyl, aryl or aralkyl group, or $R^3$ and $R^4$ together form, together with the nitrogen atom, a 5- or 6-membered heterocyclic ring; or a group of the formula:

wherein $R^5$ and $R^6$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or di- substituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, β-chloroethylamino, cyclohexylamino, anilino, sulphophenylamino, disulphophenylamino, N-methylsulphophenylamino, N-β-hydroxyethylsulphophenylamino, mono-, di- and tri-sulphonaphthylamino, sulpho-o-tolylamino, carboxyphenylamino and sulphocarboxyphenylamino, N-ω-sulphomethylphenylamino, methoxy, ethoxy, and butoxy, phenoxy, methylphenoxy, chlorophenoxy and phenylthio groups. Chlorine atoms or cyano, nitro, carboxy and carbalkoxy groups in the 5-position of a pyrimidyl radical come into the category of non-reactive substituents.

The invention also provides a process for manufacture of the new dyestuffs which comprises reacting a compound of the formula:

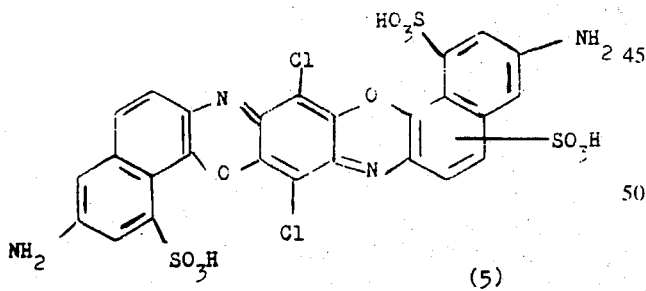

(5)

with the acid chloride of a carboxylic or sulphonic acid which contains a cellulose-reactive substituent or a heterocyclic compound which contains a halogen atom and at least one cellulose-reactive substituent attached to carbon atoms of the ring, i.e. a compound of the formula Z.Cl (6), when $n$ in formula (1) = 0.

The above process can conveniently be carried out by stirring the reactants in an aqueous medium, optionally in the presence of a water-soluble organic solvent, at a temperature within the range 0°–100°C, and preferably maintained at a pH of from 5–8.

As examples of compounds of formula (6) which may be used, there may be mentioned, for example, acid halides of α, β-unsaturated aliphatic acids such as
chloromaleic anhydride,
propiolyl chloride,
acryloyl chloride,
the acid chlorides of halogenated aliphatic acids such as chloroacetyl chloride,
sulphochloroacetyl chloride,
β-bromo- and β-chloro-propionyl chloride,
α:β-dichloro- and dibromo-propionyl chlorides,
2,2,3,3-tetrafluorocyclobutyl carbonyl chloride,
β-(2,2,3,3-tetrafluorocyclobutyl)acryloyl chloride,
2,3,3-trifluorocyclobut-1-enyl carbonyl chloride,
β-(2,3,3-trifluorocyclobut-1-enyl)acryloyl chloride,
and heterocyclic compounds which contain at least 2 nitrogen atoms in the heterocyclic rings and which contain two or more halogen, especially chlorine atoms in the ortho positions to the nitrogen atoms, such as
2:3-dichloro-quinoxaline-5- and -6-carbonyl chlorides,
2:4-dichloro-quinazoline-6-carbonyl chloride,
1:4-dichloro-phthalazin-6-carbonyl chloride,
2:4-dichloro-pyrimidine-5-carbonyl chloride,
β-(4:5-dichloro-pyridazonyl-1-)propionyl chloride,
1-(4'-chlorocarbonylphenyl)-4:5-dichloro-6-pyridazone,
2:4:6-tribromo- and trichloro-pyrimidines,
2:4:5:6-tetrachloropyrimidine,
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloro-pyrimidine,
2:4-dichloropyrimidine-5-carbonyl chloride,
4,5-dichloro-2-methylsulphonyl-6-methylpyrimidine,
2,4,6-trifluoro-5-chloropyrimidine,
cyanuric bromide,
cyanuric chloride;
the primary condensation products of cyanuric bromide or cyanuric chloride with ammonia, an alkali metal sulphite or thiocyanate or an organic mercaptan, hydroxy compound or an organic primary or secondary amine, for example:
methanol,
ethanol,
iso-propanol,
phenol,
o-, m- and p-chlorophenols,
o-, m- and p-cresols,
o-, m- and p-sulphophenols,
thiophenol,
thioglycollic acid,
dimethyldithiocarbamic acid,
mercaptobenzthiazole,
thioacetamide,
methyl-,
dimethyl-,
ethyl-,
diethyl-,
n-propyl-,
iso-propyl-,
butyl-,
hexyl- and cyclohexylamines,
toluidines, piperidine,
morpholine,
methoxyethylamine,
ethanolamine,
diethanolamine,
aminoacetic acid,
aniline-2,4-, 2,5- and 3,5-disulphonic acids,
orthanilic, metanilic and sulphanilic acids,
2-, 3- and 4-aminobenzoic acids,
4- and 5-sulpho-2-aminobenzoic acids,
4- and 5-sulpho-o-toluidines,
5-amino-2-hydroxybenzoic acid,
2-amino-ethanesulphonic acid,
amino-naphthalene mono-, di- and tri-sulphonic acids
and amino- and N-methylamino-ethanesulphonic acid;

also the secondary condensation products of cyanuric chloride with alkali metal sulphites, alkali metal thiocyanates, phenols and thiophenols containing an electronegative substituent, and compounds of the formulae:

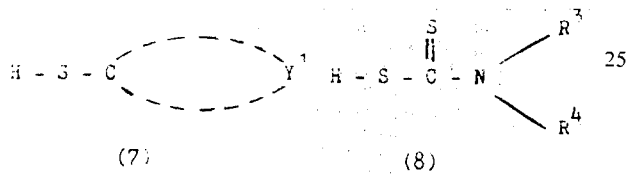

(7)        (8)

and

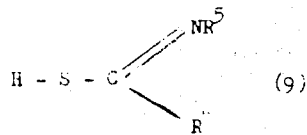

(9)

wherein $Y^1$, $R^3$, $R^4$, $R^5$ and $R^6$ have the meanings stated above.

For manufacture of the dyes of formula (1) in which $n = 1$ by this process, there is used a heterocyclic compound of the formula:

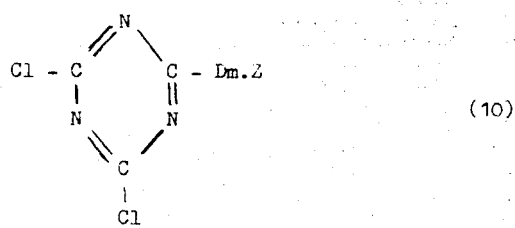

(10)

wherein the symbols Dm and Z have the meanings stated earlier, and which itself can be obtained by reacting a diamine with 1 mole of cyanuric chloride and one mole of a compound of the formula Z.Cl as illustrated above.

As examples of diamines which may be used in this connection there may be mentioned heterocyclic diamines, e.g. piperazine, aliphatic diamines e.g. alkylene-, hydroxyalkylene- or sulphatoalkylene-diamines, eg.

ethylene diamine,
propylene diamine,
1,3-diaminopropane,
β-hydroxyethylaminoethylamine,
2-hydroxy-1,3-diaminopropane,
2-sulphato-1,3-diaminopropane,
naphthylene diamine sulphonic acids, e.g.
2,6-diaminonaphthalene-1,5- and 4,8-disulphonic acids,
1,5-diaminonaphthalene-3,7-disulphonic acid
and diamine derivatives of mono- and di-cyclic compounds of the benzene series, e.g.
m- and p-phenylenediamines,
1,3-phenylenediamine-4-sulphonic and 4,6-disulphonic acids,
1,4-phenylenediamine-2-sulphonic and 2,5-disulphonic acids,
4,4'-diaminostilbene-2,2'-disulphonic acid,
benzidine-2,2'-disulphonic acid
3,3'- and 4,4'-diaminodiphenylureas
4,4'-diaminodiphenylurea-2,2'- and 3,3'-disulphonic acids,
4,4'-diaminodiphenylmethane,
4,4'-diaminodiphenoxyethane-2,2'-disulphonic acid
4,4'-diaminodiphenyl sulphone
4-methylaminoaniline-2-sulphonic acid.

The compounds of formula (5) used in the above process can be obtained by reacting 2,3,5,6-tetrachlorobenzoquinone with two moles of 2,6-diaminonaphthalene-4,8-disulphonic acid and heating the condensation product in oleum to effect ring closure.

The resulting product has a nitrogen:sulphur ratio of 4:3 and is believed to be the indicated compound, possibly admixed with small amounts of di- and tetra-sulphonic acid derivatives.

The dyes of formula 1 in which $n$ has the value 1 can also be obtained by reacting two moles of a diamine, as illustrated above, in either order with two moles of a compound of the formula Z.Cl, as illustrated above, and with one mole of the new dyestuff of the formula:

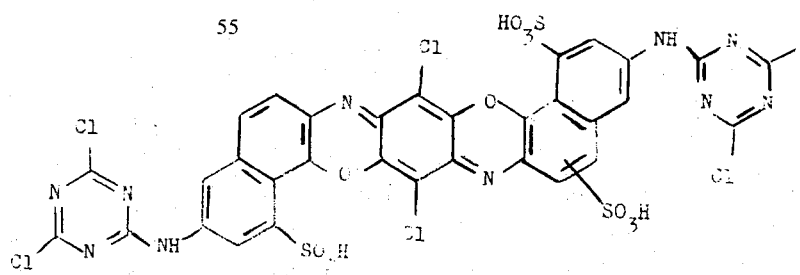

(11)

The dyes of formula (1) in which Z represents a s-triazine nucleus substituted by a chlorine or bromine atom and an amino or substituted amino group can also be obtained by reacting the corresponding dyestuff in which Z represents the dichloro- or dibromo-s-triazine group with ammonia or an amine.

This process can conveniently be carried out by stirring the reactants in an aqueous medium, optionally in the presence of a water-soluble organic solvent, at a temperature of from 30°–60°C, and preferably maintaining the pH at from 5–8 by adding an acid-binding agent to neutralise the hydrogen halide formed during the reaction. Suitable acid-binding agents are alkali metal hydroxides, carbonates and bicarbonates, or an excess of ammonia or aliphatic amine where this is one of the reactants.

As amines, there can be used, for example, any of those enumerated in the above paragraph.

The cellulose-reactive dyes of formula (1) wherein the cellulose-reactive group is a s-triazine nucleus substituted by $SO_3H$, a quaternary ammonium group or a group of formulae (2), (3) and (4), can be obtained in a similar manner by reacting a cellulose-reactive dye of formula (1) containing a striazine group substituted by at least one chlorine or bromine atom with an alkali metal salt of sulphurous acid, a tertiary amine or a compound of formulae (7), (8) and (9).

The new dyestuffs can be used for colouring a variety of materials, e.g. natural and synthetic polyamide materials, e.g. wool and nylon, but more particularly natural or artificial cellulose materials, e.g. cotton, linen and viscose rayon, which then dye or print in the presence of alkali to give bright reddish blue shades of high tinctorial value having good fastness to light and washing treatments.

The invention is illustrated by the following Examples in which parts and percentages are by weight.

EXAMPLE 1

10.0 Parts of the 3,12-diamino-8,17-dichlorodibenzo[c,n]-triphen dioxazine containing 3.0 potassium sulphonate groups per molecule obtained as described below, are dissolved in 800 parts of water and the solution is added to a suspension of 3.20 parts of cyanuric chloride in a mixture of 40 parts of acetone and 100 parts of water at 0°–5°C. The pH is maintained at 5.5–6.5 throughout and stirring is continued under these conditions for 3½ hours. The resultant solution is filtered and the product is precipitated from the filtrate by the addition of sodium chloride (250 g/l). The dyestuff is filtered off and dried at room temperature. It dyes cellulose textile materials in bright reddish-blue shades.

The 3,12-diamino-8,17-dichlorodibenzo[c,n]-triphendioxazine used in the above Example was obtained as follows:-

690 Parts of the disodium salt of 2,6-diaminonaphthalene-4,8-disulphonic acid are dissolved in 3000 parts of water and an ethanolic slurry of 246 parts of 2,3,5,6-tetrachloro-1,4-benzoquinone is added. The mixture is stirred at 60°C for 2 hours, the pH being maintained at 6–7 throughout by the addition of 2N sodium hydroxide solution. 600 parts of sodium chloride are added to the cooled solution and the product is filtered off and washed with 20% brine and then dried at 80°C to give a brown solid.

A mixture of 40 parts of the solid and 400 parts of 26% oleum is stirred at 95°C for 5 hours, then added to 8000 parts of ice-water. The precipitate is filtered off, washed with saturated potassium chloride solution and dried at 80°C. It is purified as follows:

28.5 Parts of the crude cyclisation product are stirred with 6000 parts of water, and 100 parts of saturated potassium acetate solution added. The resultant solution is filtered, and the filtrates treated with a further 3000 parts of saturated potassium acetate solution. The precipitate is filtered off, washed with 30% potassium acetate solution, then ethanol and finally dried at 80°C to give a crystalline red solid which dissolves in water to give a bright blue solution.

On subjecting the purified product to elemental analysis the N:S ratio weight is 4.7:8.5, corresponding to an atomic ratio of 4:3.1.

Dyestuffs of a similar shade are obtained if the cyanuric chloride used in Example 1 is replaced by an equivalent amount of any of the following:

| Ex. | |
|---|---|
| 2 | 2,4-dichloro-6-methoxy-s-triazine |
| 3 | 2,4-dichloro-6-n-butoxy-s-triazine |
| 4 | 2,4-dichloro-6-phenoxy-s-triazine |
| 5 | 2,4-dichloro-6-anilino-s-triazine |
| 6 | 2,4-dichloro-6-β-ethoxyethoxy-s-triazine |
| 7 | 2,4-dichloro-6-methylamino-s-triazine |
| 8 | 2,4-dichloro-6-amino-s-triazine |
| 9 | 2,4-dichloro-6-dimethylamino-s-triazine |
| 10 | 2,4,6-trichloropyrimidine |
| 11 | 2,4,5,6-tetrachloropyrimidine |
| 12 | 2,4-dichloropyrimidine-5-carbonyl chloride |
| 13 | 2,4,6-trichloro-5-cyanopyrimidine |
| 14 | 2,4-dichloro-6-β-hydroxyethylamino-s-triazine |
| 15 | 2,4,6-trifluoro-5-chloropyrimidine |
| 16 | 2,4-dichloro-6-4'-sulphophenoxy-s-triazine |
| 17 | 2,4-dichloro-6-4'-chlorophenoxy-s-triazine |
| 18 | 2,4-dichloro-6-3'-sulphophenoxy-s-triazine |
| 19 | 2,4-dichloro-6-phenylthio-s-triazine |
| 20 | 2,4-dichloro-6-β-sulphatoethylamino-s-triazine |
| 21 | 2,4-dichloro-6-(m-β-sulphatoethylsulphonylanilino)-s-triazine |
| 22 | 2,4-dichloro-6-cyclohexylamino-s-triazine |
| 23 | 2,4-dichloroquinazoline-6-sulphonyl chloride |
| 24 | 2,4-dichloroquinazoline-6-carbonyl chloride |
| 25 | 2,3-dichloroquinoxaline-6-carbonyl chloride |
| 26 | β-(4,5-dichloropyridaz-6-on-1-yl)propionyl chloride |
| 27 | 2,4,6-tribromopyrimidine |
| 28 | 2-methylsulphonyl-4,5-dichloro-6-methylpyrimidine |
| 29 | 3,6-dichloropyridazine-4-carbonyl chloride |
| 30 | 2,3-dichloroquinoxaline-6-sulphonyl chloride |
| 31 | 1,4-dichlorophthalazine-6-carbonyl chloride |
| 32 | β-(2,2,3,3-tetrafluorocyclobutyl)acryloyl chloride |
| 33 | 2,2,3,3-tetrafluorocyclobutyl carbonyl chloride |
| 34 | 5-chloro-6-methyl-2,4-bis(methylsulphonyl)pyrimidine |
| 35 | 6-methyl-2,4-bis(methylsulphonyl)pyrimidine |
| 36 | 2,4-dichloro-6-β-methoxyethoxy-s-triazine |

EXAMPLE 37

A neutral solution of 3.8 parts of metanilic acid in 100 parts of water is added to a suspension of 4.4 parts of cyanuric chloride in a mixture of 40 parts of acetone and 160 parts of water at 0°–5°C. The pH is maintained at 5.5–6.5 throughout by addition of 2N sodium hydroxide and stirring is continued under these conditions for 1 hour. The solution is screened and 11.0 parts of the 3,12 diamino-8,17-dichlorodibenz[c,n]-triphendioxazine containing 3.0 potassium sulphonate groups per molecule purified as described in Example 1 is added. After stirring at pH 5.5–6.5 and 55°C for 10 hours the reaction mixture is cooled to 20°C and potassium chloride (300 g/l) added. The precipitate is filtered off, washed with saturated potassium chloride solution then dried at room temperature. The dyestuff obtained dyes cellulosic textile materials in bright reddish-blue shades.

Dyestuffs giving a similar shade are obtained if the metanilic acid used in the above Example is replaced by an equivalent of any of the following:

| Example | |
|---|---|
| 38 | aniline-4-sulphonic acid |
| 39 | aniline-2,5-disulphonic acid |
| 40 | aniline-3,5-disulphonic acid |
| 41 | ω-sulphomethylaniline |
| 42 | 2-aminonaphthalene-4,8-disulphonic acid |
| 43 | 2-aminonaphthalene-1,5-disulphonic acid |
| 44 | 1-aminonaphthalene-3,6-disulphonic acid |
| 45 | 1-aminonaphthalene-5-sulphonic acid |
| 46 | 1-aminonaphthalene-3,6,8-trisulphonic acid |
| 47 | aniline-2-sulphonic acid |
| 48 | aniline-2,4-disulphonic acid |
| 49 | aniline-2-carboxylic acid |
| 50 | aniline-4-carboxylic acid |
| 51 | 4-sulphoaniline-2-carboxylic acid |
| 52 | N-methylaniline-4-sulphonic acid |
| 53 | 2-methylaniline-5-sulphonic acid |
| 54 | 2-methoxyaniline-4-sulphonic acid |
| 55 | 2-chloroaniline-5-sulphonic acid |

EXAMPLE 56

A solution of 4.5 parts of 1,4-phenylenediamine-2,5-disulphonic acid in 70 parts of water is added to a suspension of 6.4 parts of cyanuric chloride in 200 parts of water and 35 parts of acetone, and the mixture is stirred at 0°–5°C, pH 6–7 for 10 hours.

The resulting solution is then added to a solution of 10 parts of 3,12-diamino-8,17-dichlorodibenzotriphenodioxazine trisulphonic acid in 800 parts of water and the mixture is stirred at 45°C, pH 6–7 for 5 hours. The product is isolated by salting and drying. It dyes cellulose textile materials in bright reddish-blue shades.

Similar products are obtained if the 1,4-phenylenediamine used in the above example is replaced by an equivalent amount of:

| Example | |
|---|---|
| 57 | 1,3-phenylenediamine-4-sulphonic acid |
| 58 | 1,4-phenylenediamine-2-sulphonic acid |
| 59 | 1,3-phenylenediamine-4,6-disulphonic acid |

Other similar dyestuffs are obtained if the diamine of column II of the following table is reacted with 1 mole of the reaction product of cyanuric chloride and the compound of column III, and then with 1 mole of cyanuric chloride, and the resulting product used in place of the solution of paragraph one of Example 56:

| Ex. | II | III |
|---|---|---|
| 60 | 1,3-phenylenediamine-4-sulphonic acid | metanilic acid |
| 61 | " | phenol-4-sulphonic acid |
| 62 | " | orthanilic acid |
| 63 | 1,4-phenylenediamine-2-sulphonic acid | sulphanilic acid |
| 64 | " | aniline-3,5-disulphonic acid |
| 65 | " | 2-methoxyaniline-5-sulphonic acid |
| 66 | 1,4-phenylenediamine-2,5-disulphonic acid | methanol |
| 67 | " | methylamine |
| 68 | " | aniline |
| 69 | 1,3-phenylenediamine-4,6-disulphonic acid | ammonia |
| 70 | " | phenol |
| 71 | " | β-hydroxyethylamine |
| 72 | ethylene diamine | 2,5-disulphoaniline |
| 73 | " | 2-carboxy-4-sulphoaniline |
| 74 | " | 1-naphthylamine-3,6,8-trisulphonic acid |
| 75 | 2-sulphato-1,3-diaminopropane | 2-chloro-4-sulphoaniline |
| 76 | " | 2-methyl-5-sulphoaniline |
| 77 | " | 2-naphthylamine-4,8-disulphonic acid |

EXAMPLE 78

3.2 parts of cyanuric chloride are reacted with 10 parts of 3,12-diamino-8,17-dichlorodibenzotriphendioxazine trisulphonic acid as described in Example 1. Instead of isolating the product, a solution obtained by condensing 3.2 parts of cyanuric chloride with 3.2 parts of 1,3-phenylenediamine-sulphonic acid and 3.1 parts of metanilic acid in 300 parts of water is added and the mixture is stirred at 50°C, pH 6–7 for 10 hours.

The product is isolated by salting; it is identical with Example 60. Examples 57, 58, 61 to 65 and 72 to 77 can also be made in an analogous manner.

EXAMPLE 79

3.2 parts of cyanuric chloride are reacted with 10 parts of 3,12-diamino-8,17-dichlorodibenzotriphendioxazine trisulphonic acid as described in Example 1. Instead of isolating the product, a solution of 3.2 parts of 1,3-phenylenediamine-4-sulphonic acid in 300 parts of water is added and the mixture is stirred at 45°C, pH 4–4.5 for 6 hours.

A solution obtained by reacting 3.2 parts of cyanuric chloride with 3.1 parts of metanilic acid at 0°–5°C, pH 6.5 for 2 hours in 200 parts of water is added and the mixture is stirred at 45°–50°C, pH 6–7 for 8 hours.

The product is isolated by salting and is an isomer of Example 60. Examples 56 and 59, and isomers of Examples 57, 58, 61 to 65 and 72 to 77 can be made in an analogous manner.

EXAMPLE 80

9.2 parts of 3,12-bis(dichloro-s-triazinylamino)-8,17-dichlorodibenz[c,n-triphendioxazine having 3.0 potassium sulphonate substituents per molecule, obtained as described in Example 1, are stirred at 25°C for 5 hours with 1.5 parts of concentrated ammonium hydroxide liquor (S.G. 0.88) and 800 parts of water. The product is precipitated by the addition of salt and collected by filtration. It is identical with Example 8 and dyes cellulosic textile materials in bright reddish-blue shades.

Other dyestuffs described in the earlier Examples can be obtained by substituting the appropriate amine for the ammonium hydroxide used above. Thus the use of aniline, methylamine, dimethylamine or ethanolamine gives Examples 5, 7, 9 or 14 respectively. Examples 20–22 and 37–55 can be obtained in an analogous manner. Similarly, Examples 60, 62–65, 67–69 and 71–77 can be obtained by reacting the products of Examples 56–59, with ammonia or the appropriate amine.

I claim:
1. A dyestuff of the formula

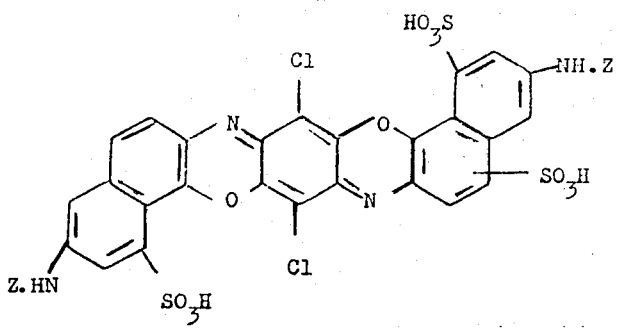

wherein Z is
1. 4,6-dichloropyrimid-2-yl,
2. 4,5,6-trichloropyrimid-2-yl,
3. 2,4-dichloropyrimid-5-yl carbonyl,
4. 4,6-dichloro-5-cyanopyrimid-2-yl,
5. 4,6-difluoro-5-chloropyrimid-2-yl,
6. 2,4-dichloroquinazolin-6-ylsulphonyl,
7. 2,4-dichloroquinazolin-6-yl carbonyl,
8. 2,3-dichloroquinoxalin-6-ylcarbonyl,
9. β-(4,5dichloropyridaz6-on-1-yl) propionyl,
10. 4,6-dibromopyrimid-2-yl,
11. 2-methylsulphonyl-5-chloro-6-methylpyrimid-4-yl,
12. 3,6-dichloropyridazin-4-ylcarbonyl,
13. 2,3-dichloroquinoxalin-6-ylsulphonyl,
14. 1,4-dichlorophthalazin-6-ylcarbonyl,
15. β-(2,2,3,3-tetrafluorocyclobutyl) acryloyl,
16. 2,2,3,3-tetrafluorocyclobutylcarbonyl,
17. 2,methylsulphonyl-6-methylpyrimid-4-yl and

(18) 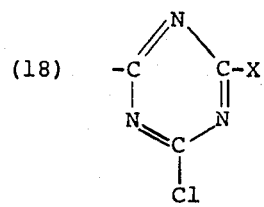

wherein X is selected from Cl; lower alkoxy;

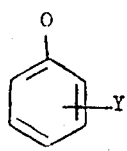

wherein Y is H, Cl or $SO_3H$;

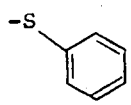

lower alkoxy alkoxy; $NH_2$; lower alkylamino; di (lower alkyl) amino; lower hydroxyalkylamino; β-sulphatoethylamino; anilino;

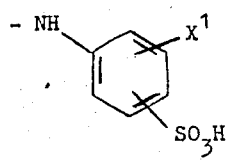

wherein $X^1$ is H, $CO_2H$, $CH_3$, $OCH_3$, Cl or $SO_3H$; cyclohexylamino;

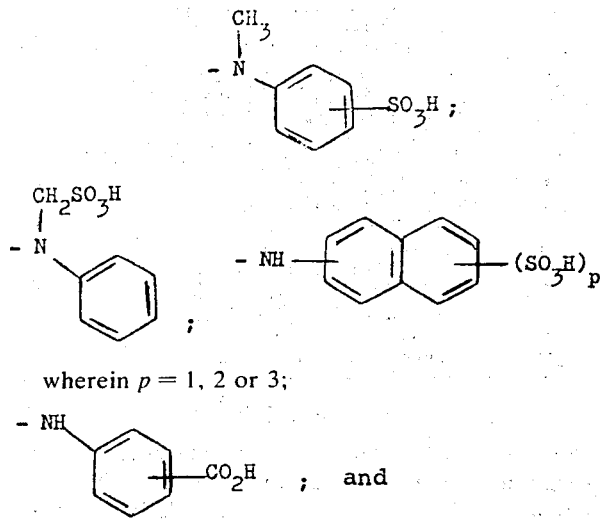

wherein $p = 1$, 2 or 3;

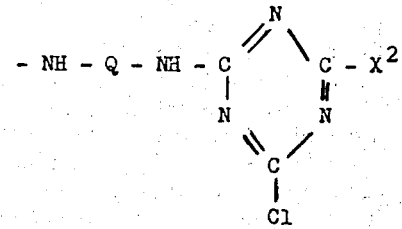

; and

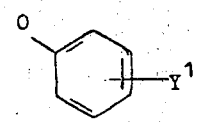

wherein Q is sulphophenylene, disulphophenylene, ethylene or 2-sulpho-1,3-trimethyline and $X^2$ is Cl; $OCH_3$;

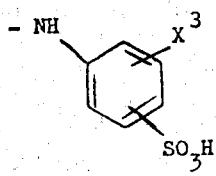

wherein $Y^1$ is H or $SO_3H$; $NH_2$; lower allylamino; β-hydroxyethylamino; anilino;

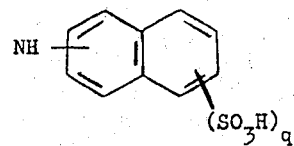

wherein $X^3$ is H, $CO_2H$, $CH_3$, $OCH_3$, Cl or $SO_3H$; or wherein $q = 2$ or 3.

2. A dyestuff as claimed in claim 1 having the formula:
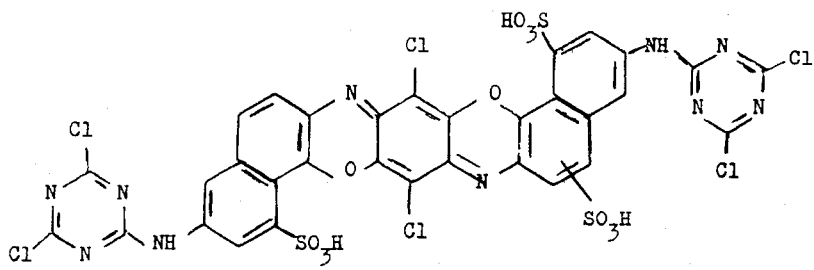
3. A dyestuff as claimed in claim 1 having the formula:
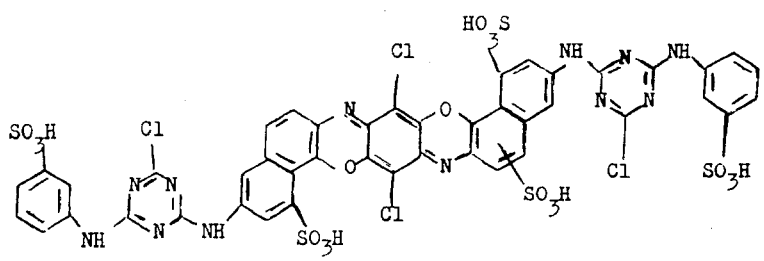
4. A dyestuff as claimed in claim 1 having the formula:
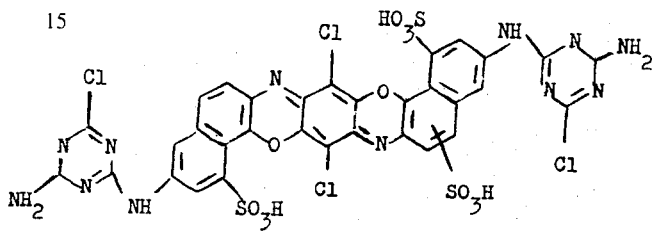
5. A dyestuff as claimed in claim 1 having the formula:
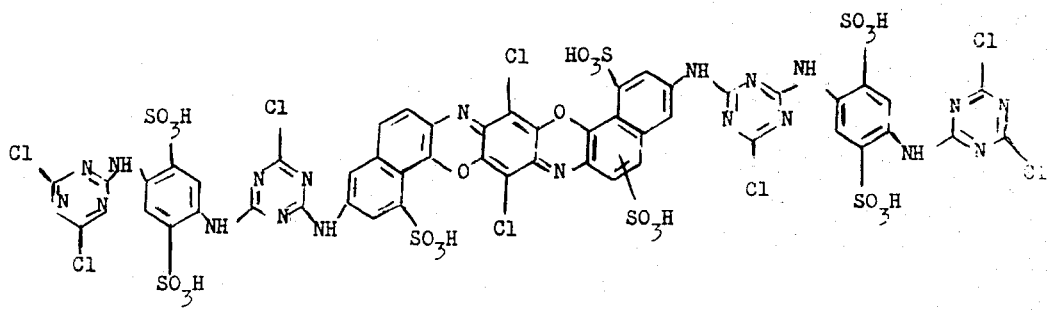
* * * * *